(No Model.) 2 Sheets—Sheet 1.
H. LEMP.
ELECTRIC WELDING MACHINE.
No. 523,987. Patented Aug. 7, 1894.
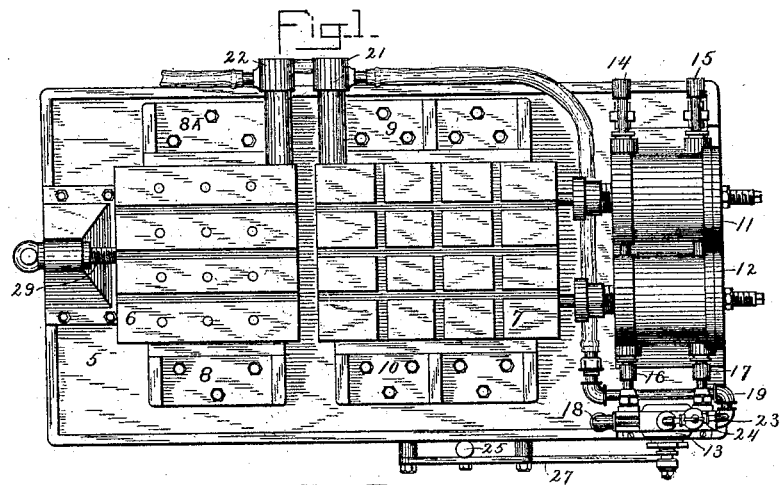
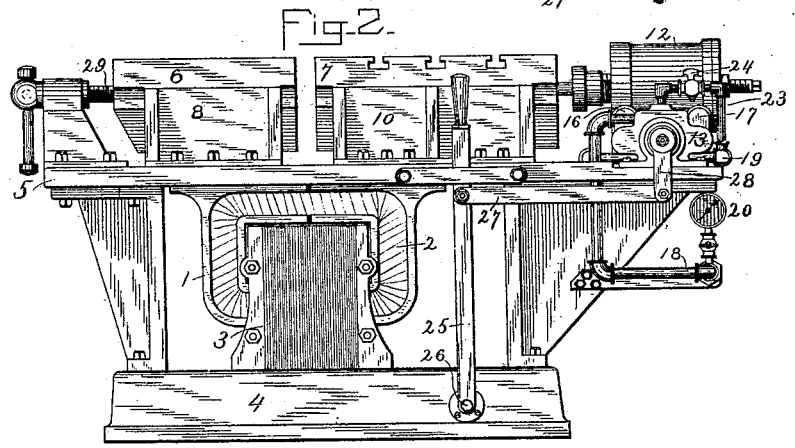
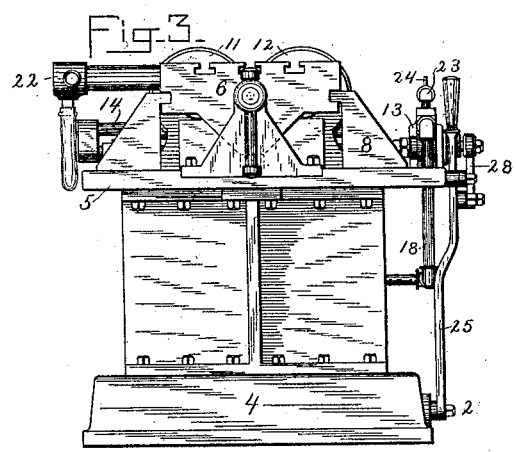
WITNESSES:
J. A. Hurdly
T. F. Courey
INVENTOR:
Hermann Lemp
By H. C. Townsend
Atty (No Model.) 2 Sheets—Sheet 2.
H. LEMP.
ELECTRIC WELDING MACHINE.
No. 523,987. Patented Aug. 7, 1894.
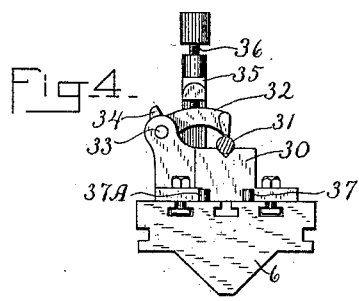
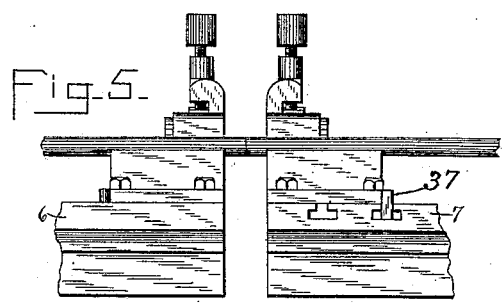
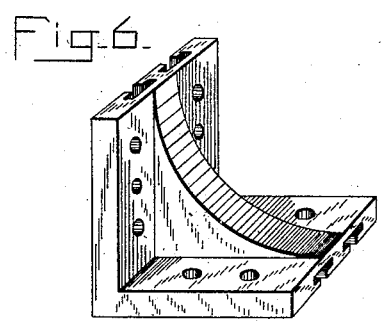
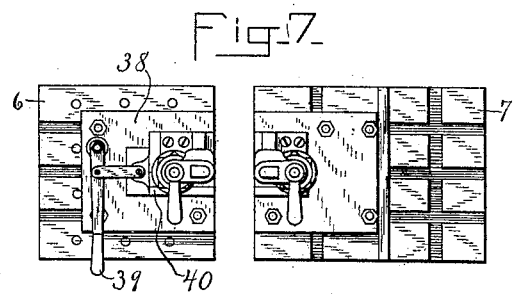
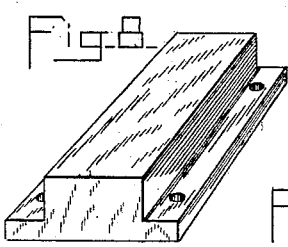
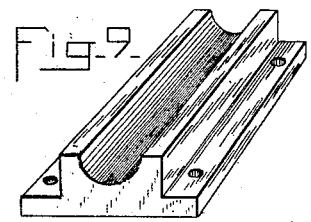
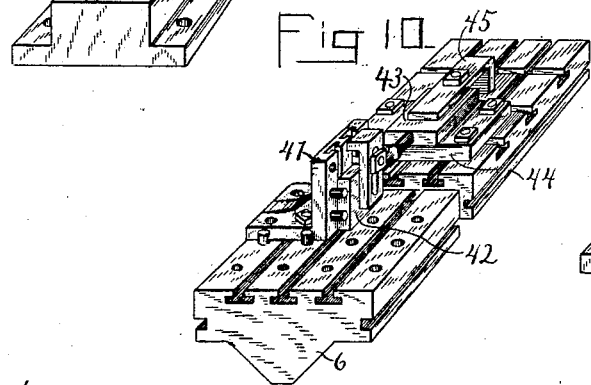
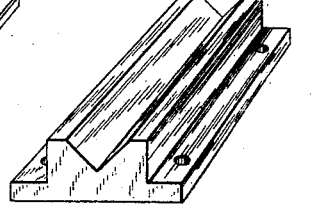
WITNESSES:
J. A. Hurdle
T. F. Courey
INVENTOR:
Hermann Lemp
By H. L. Townsend
Atty.
THE NORRIS PETERS CO., PHOTO-LITHO., WASHINGTON, D. C.

UNITED STATES PATENT OFFICE.

HERMANN LEMP, OF LYNN, MASSACHUSETTS, ASSIGNOR TO THE THOMSON ELECTRIC WELDING COMPANY, OF MAINE.

ELECTRIC-WELDING MACHINE.

SPECIFICATION forming part of Letters Patent No. 523,987, dated August 7, 1894.

Application filed January 19, 1891. Serial No. 378,224. (No model.)

*To all whom it may concern:*

Be it known that I, HERMANN LEMP, a citizen of the United States, and a resident of Lynn, in the county of Essex and State of Massachusetts, have invented a certain new and useful Electric-Welding Machine, of which the following is a specification.

My invention relates to the construction of electric metal working apparatus and especially to apparatus designed for use in the electric welding process. Heretofore it has been customary in the art to design and construct special machines for each particular class of welding work. This practice has been made necessary mainly on account of the irregularities in outline and peculiar shapes of the numerous pieces to be welded, upset or otherwise operated upon and each requiring some special clamping device the employment of which would render necessary an alteration in the whole design of the machine. This not only meant expense to the builders, but to the users. The builder could standardize but little, and consequently new designs had to be made for each demand. The user could operate upon but one or two classes of work with his machine, and needed several welders to do a variety of work. When the demand for each variety is great, it is preferable to possess several machines, as time is saved; but if at times it is desired to weld odds and ends, it is convenient to be able to do it on the machine which is ordinarily used for some other purpose. Again in the case of a manufacturer who is regularly welding bars or tubes of a certain diameter for any special purpose, he may wish to weld up a lot of smaller or larger pieces to fill an order. By having a machine which can be changed to do the required work, he may save time and expense. In other cases there has been a demand for a machine adapted for mending tools or broken parts of machines and for performing all kinds of odd jobs, but the forms of machine heretofore constructed have not been adapted to such work and could only be used to a limited extent in repair work.

My invention consists in constructing electric metal working or welding machines so that they shall be in their main features essentially all alike, and providing accessory devices of different or varied character which may be attached to the machine as occasion may demand in connection with the different kinds of work to be done. Such attachments or accessories are so made that no skill is required in effecting a change for variety of work beyond that of the ordinary machinist, as will hereinafter more clearly appear.

Electric metal working and welding apparatus as ordinarily constructed are provided with two terminals or electrodes placed in line with one another and adapted to be moved to and from one another in the same line. These terminals or electrodes are ordinarily furnished with proper means for holding or clamping the work in place upon it which holding or clamping devices are generally permanently attached to and form in effect an integral part of said contact terminal or electrode. In order to get the required movement of the one electrode or terminal toward the other when the work is placed upon them, one or both of said terminals or electrodes is made movable toward the other.

My invention consists essentially in making the work holding devices or blocks independent of the contact terminals or electrodes and constructing the latter so that the work holding or clamping devices which are themselves adapted for various kinds or shapes of work, as hereinafter more particularly described, may be attached to or removed from said terminals or electrodes at pleasure. Preferably I provide the surface of the contact terminals or electrodes to which the work holding attachments or accessories may be applied with one or more grooves or series of holes or perforations, and preferably employ a number of such grooves or series of holes or perforations which may be either all parallel with one another or may be arranged on lines transverse to one another where it is desired to provide for the greatest variety of work.

My invention consists further in certain features of construction hereinafter described and more particularly specified in the claims.

The terminal plates or electrodes are arranged in line with one another like those of an ordinary welding machine and one or both may be made to slide in contact with a suitable bed connected with a source of electric energy.

I have herein shown my invention and described the same as carried out in connection with a source of energy consisting of a transformer, the secondary bar or conductor of which has terminals forming the rests or supports for the contact slide or terminal formed as set forth, but the invention is alike applicable to other constructions of welding apparatus wherein the heating electric currents are obtained in other ways.

In the accompanying drawings:—Figure 1, is a plan of a machine embodying my invention. Fig. 2, is a side elevation of the same. Fig. 3, is an end view. Figs. 4, 5, 6, 7, 8, 9, 10 and 11, illustrate the various attachments which are to be used with the machines illustrated in Figs. 1, 2 and 3.

1, is the secondary of an alternating current transformer constructed substantially on the plan described in the patent of H. Lemp, No. 428,618.

2, indicates the primary which is contained in a groove in the side of the secondary while 3, indicates the usual laminated iron core passing through the opening in the bar secondary. This is the type of transformer which is preferably used in the universal machine constituting my invention.

4, is a base which supports the core 3, and a table 5, carrying the devices for imparting movement to the sliding terminal of the machine, the mechanical guides for such slides and other auxiliary devices.

As well understood in the art the terminals of the secondary 1, which are formed by slitting the upper side of the same, as indicated, carry slides or work holders which move on the secondary and are guided thereon in any suitable way, but as heretofore constructed have been of different designs for each class of work to be performed.

In machines built upon the principle herein described, all the slides would be alike and the adaptability for different classes of work is secured by constructing the slides as herein shown and provide suitable means for attaching or detaching suitable forms of work thereto.

In the present instance the terminal of the machine which is to be given a sliding movement toward and from the other in the welding operation is indicated at 7, and may be designated as the contact slide or terminal of the machine. The terminal 6 will be capable of movement or not as desired, but is preferably made to have a limited movement as will be presently described. The two terminals 6 and 7, are rigidly guided by the guides 8, 8ᴬ, 9 and 10, Fig. 1 which are bolted to the table 5, or other suitable support. These guides insure a perfectly straight motion and prevents tilting of the terminals or slides in their ways when they are under pressure or subjected to any abnormal strain. The terminal 7, works as a contact slide upon a suitable way or surface which is formed upon the end of the secondary 1, or is otherwise constructed and furnished with the heating electric current. As shown Fig. 3 the slide works in a V groove. The terminal 6, may be similarly guided on a V way when it is made movable. The tops of the terminals 6, 7, are formed as plates provided with longitudinal and transverse grooves, as shown, on the plate or terminal 7, or with longitudinal grooves and a number or series of holes arranged in transverse lines as indicated on the top of the plate forming the top surface of the terminal 6. As will be obvious, the formation of both plates is substantially like that of the single plate known as the planer-bed of a planing machine the grooves and holes constituting the usual work-holder chocking devices.

In connection with each of the slides or terminal 6, I provide suitable attachable and detachable clamping devices or work holders adapted for attachment to the top of said terminal plates and of varied character depending upon the shape or forms of work, as will be presently described.

The pressure devices for applying pressure to the slides 7, in the operation of welding, upsetting or other work may be of any suitable design, and consist of levers, screws geared to impart a powerful pressure when necessary, or devices for imparting pneumatic or hydraulic pressure. I prefer to employ devices of the latter character and have herein shown such devices provided with suitable means for adjusting and regulating the pressure whereby the proper welding pressure may be applied by the workman according to the material or size of work. The contact slide 7, is herein shown as connected to the piston rods of two cylinders, 11, 12. The cylinders 11, 12, are connected by means of pipes 14, 15, 16 and 17, to a four way valve 13, whereby pressure may be applied at either side of the pistons while at the same time the liquid or fluid employed is allowed to exhaust from the opposite side. The liquid or fluid employed is supplied under pressure through a feed pipe 18, to the valve. The waste or exhaust pipe connected to said valve is indicated at 19, and connects through a suitable flexible tube with the pipes 21 and 22, which in turn connect with channels and passages in the slides for the purpose of supplying a liquid which shall keep them cool.

A tube 23, connects the feed pipe with the waste pipe, as shown, and constitutes a by-pass around the valve 13, and the cylinders so that a water circulation may be kept up after the liquid is exhausted from the cylinders. A cock 24, in said pipe controls the passage of the liquid through this by-pass. For operating the main valve 13, any means may be employed, as for instance a lever 25, pivoted to the base 26, and connected by a strap or link 27, to the valve handle 28. The terminal 6, is backed by a screw 29, to hold it against the pressure applied in the welding or other operation. This screw 29, may be also adjusted to adjust the slide 6, backwardly as may be necessary when a greater separation of the two terminals of the machine is required in the welding or other operation. This adjustment supplements that which is provided for by the movement of the pistons in a backward direction which latter movement is limited, however, by the play of the pistons in the cylinders.

Means for applying and adjusting the pressure upon the movable slide 7, and consisting of the pressure cylinders, the valve and the gage 20, indicating the proper welding pressure, are not herein claimed as they form the subject of another application for patent filed by me June 25, 1890, Serial No. 356,632.
So much of the machine as has been described, to wit: the transformer or other source of energy, the contact slides or terminals formed as described and the means for imparting the pressure is universal.
The succeeding figures illustrate various forms of work holding attachments which may be applied to the machine when different kinds of work are to be done.

Figs. 4 and 5, show an end and side view of clamping devices arranged for doing one class of work. Such clamps attached to the universal machine would make it practically the same as one designed for a special purpose as far as the owner is concerned; and the builder merely needs to "specialize" on the clamps alone, the other parts being the same as in every other machine.

The particular clamps shown in Figs. 4 and 5, are typical of what might be used to grasp plain bars or tubes, and to work quickly.

6, is one of the slides of the universal machine. Bolted to it is the work holding block 30, (Fig. 4) which supports the piece to be worked, 31. The clamping jaw is on the end of an arm 32, pivoted at 33 on said block. A screw 36, working through a pivoted piece 35, bears down upon the arm 32. The curve of the arm 32, is slightly eccentric to the path of the screw, so that merely pulling the handle of 36, forward will tighten the jaw upon 31. Pushing arm 35, backward will loosen the jaw and the arm by striking against the projection 34, on the arm 32, will lift the jaw entirely away from 31. This is a very desirable form of clamp, when many bars of the same diameter are to be worked, as it is so rapid in working. The pins 37 and 37$^A$, are placed in the holes in the slide to back up the block 30, and relieve the bolts from strain.
Fig. 7, illustrates an arrangement to be used when small wire is to be welded on a large machine in which the pressure device is too large or heavy to permit delicate work. The inertia of the slides 6 and 7, may be too great also, and it is preferable to use light and small movable parts. In such a case a separate block having a sliding clamp, with its own pressure device, may be bolted to the top of slide 6 or 7, and used as a small machine would be. ·38, is a base block secured to 6, by the usual stops, bolts and screws. 40, is a small sliding clamp (with any suitable clamp for holding the wire), moving in a groove in 38, the pivoted lever 39, supplying the welding pressure to the clamp 40. The arrangements on 7, are similar, except it may or may not have a pressure device attached.

Figs. 6, 8, 9 and 11, show various forms of work holding blocks that may be attached to the machine for various purposes and upon which the work may be held by any suitable means, as by clamps applied in the manner indicated at 45 in Fig. 10.

Fig. 9, shows a form of block or holder suitable for pipes and round pieces, and Fig. 11, a form suitable for square bars.

Fig. 8, shows a form adapted for use with flat plates, and Fig. 6, an angle plate which may be used as indicated in Fig. 10.

Fig. 10, illustrates the manner of using the apparatus for the purpose of welding together projections extending from two plates placed at right angles to one another. The angle piece or block 41, which is similar to that shown in Fig. 6 is bolted to the terminal plate or slide 6, of the machine and the plate 42, which carries the projection to be welded to the projection from an opposite plate 43, is fastened to the block 41, by a suitable bolt and plate as shown. The plate 43, is blocked up by a flat conducting piece or block 44, similar to that indicated in Fig. 8, and is held down by a clamp 45. Pins may be placed in the angle plate for 42, to back against, and also in the bed, to take the strain upon 41, when the welding pressure is applied.

Other ways of using the machine for other kinds of work will be obvious to skilled machinists who will readily know how and where to place the bolts and stays for holding the pieces to be welded or operated upon.

As is obvious this universal welding machine is adapted to be used by those acquainted with machinery, and does not require special knowledge of electric welders.
What I claim as my invention is—

1. In an electric welding or metal working machine, the combination with the transformer secondary, of plates, one located on each terminal of said secondary and provided with intersecting work-holder chocking grooves, and universal work holders adjustable laterally and longitudinally thereon.

2. In an electric welding or metal working machine, the combination with the transformer secondary, of plates, one located on each terminal of said secondary and provided with lines of work-holder chocking devices, angle blocks one side of which is adapted for attachment to said plates while the other side is provided with lines of work holder chocking devices, and universal work holders adjustable upon said blocks.

3. In an electric welding or metal working machine, the combination with the transformer secondary, of ways upon the terminals thereof, plates fitted to slide in said ways and provided with lines of work-holder chocking devices, guides upon said terminals for engaging in grooves in the plates and holding said plates in close contact with said ways, and work-holders adjustably and detachably secured to said plates.

4. In an electric metal working machine, the combination substantially as described with a contact terminal or electrode for said machine, of a supplemental work-holder mounted upon a support attachable and detachable from said electrode, and provided with its own pressure device, as and for the purpose described.

Signed at Lynn, in the county of Essex and State of Massachusetts, this 13th day of January, A. D. 1891.

HERMANN LEMP.

Witnesses:
JOHN W. GIBBONEY,
WARREN B. LEWIS.